United States Patent
Aymard et al.

(10) Patent No.: US 10,448,652 B2
(45) Date of Patent: Oct. 22, 2019

(54) FOOD PRODUCT WITH FILLING WITH HIGH AMOUNT OF LIVE LACTIC CULTURES

(71) Applicant: Generale Biscuit, Rungis (FR)

(72) Inventors: Pierre Aymard, Antony (FR); Lenka Gruntoradova, Bures sur Yvette (FR)

(73) Assignee: Generale Biscuit, Clamart (FR)

( * ) Notice: Subject to any disclaimer, the term of this patent is extended or adjusted under 35 U.S.C. 154(b) by 292 days.

(21) Appl. No.: 14/401,035

(22) PCT Filed: Jun. 4, 2013

(86) PCT No.: PCT/EP2013/061496
§ 371 (c)(1),
(2) Date: Nov. 13, 2014

(87) PCT Pub. No.: WO2013/182564
PCT Pub. Date: Dec. 12, 2013

(65) Prior Publication Data
US 2015/0147438 A1    May 28, 2015

(30) Foreign Application Priority Data
Jun. 8, 2012 (EP) .................................... 12305657

(51) Int. Cl.
*A21D 13/00* (2017.01)
*A21D 13/24* (2017.01)
(Continued)

(52) U.S. Cl.
CPC ............. *A21D 13/24* (2017.01); *A21D 13/28* (2017.01); *A21D 13/32* (2017.01); *A21D 13/36* (2017.01);
(Continued)

(58) Field of Classification Search
CPC .............. A23L 1/3014; A21D 13/0025; A21D 13/0041
(Continued)

(56) References Cited

U.S. PATENT DOCUMENTS 4,596,714 A    6/1986  Brabbs
5,573,793 A    11/1996 Saintain
(Continued)

FOREIGN PATENT DOCUMENTS

CN    2565271 Y    8/2003
CZ    14735 U1    11/2004
(Continued)

OTHER PUBLICATIONS

FR 2-895-877—Machine Translation.*
(Continued)

*Primary Examiner* — Hamid R Badr
(74) *Attorney, Agent, or Firm* — Fitch, Even, Tabin & Flannery LLP

(57) ABSTRACT

A food product and method for producing is provided. The food product comprising a biscuit part and a filling part, the filling part including a water-based filling and an anhydrous filling with live lactic cultures. The water-based filling and the anhydrous filling are distinct. The anhydrous filling has a lactic ferment cell count per gram of the anhydrous filling of at least $10^5$ cfu/g, preferably $10^6$ cfu/g, more preferably $10^7$ cfu/g, the food product presenting a decay rate of the lactic cultures of at most 0.25 $\log_{10}$ per month.

14 Claims, 1 Drawing Sheet

Figure 1:
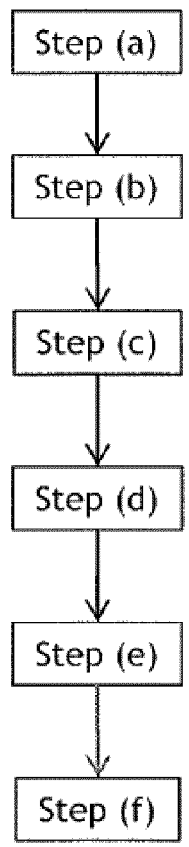

(51) Int. Cl.
    *A23L 33/135*     (2016.01)
    *A21D 13/38*     (2017.01)
    *A21D 13/36*     (2017.01)
    *A21D 13/32*     (2017.01)
    *A21D 13/28*     (2017.01)

(52) U.S. Cl.
    CPC ............ *A21D 13/38* (2017.01); *A23L 33/135* (2016.08); *A23V 2002/00* (2013.01)

(58) Field of Classification Search
    USPC .......................................................... 426/61
    See application file for complete search history.

(56) References Cited

U.S. PATENT DOCUMENTS

| | | |
|---|---|---|
| 2002/0122864 A1 | 9/2002 | Baensch et al. |
| 2004/0115308 A1* | 6/2004 | Bengtsson-Riveros ............ A23L 7/104 426/61 |
| 2004/0185158 A1 | 9/2004 | McHugh et al. |
| 2006/0045938 A1* | 3/2006 | Slesinski .................. A23G 3/48 426/93 |
| 2009/0304864 A1 | 12/2009 | Marchal et al. |

FOREIGN PATENT DOCUMENTS

| | | |
|---|---|---|
| EP | 372596 A2 | 6/1990 |
| EP | 0666031 A2 | 8/1995 |
| EP | 0687420 A2 | 12/1995 |
| EP | 0948896 A1 | 10/1999 |
| EP | 1010372 A2 | 6/2000 |
| EP | 1269857 A2 | 1/2003 |
| FR | 2811867 A1 | 1/2002 |
| FR | 2895877 A1 | 7/2007 |
| JP | 60176543 A | 9/1985 |
| JP | 2257822 | 10/1990 |
| JP | 833456 | 2/1996 |
| JP | 2000175615 A | 6/2000 |
| JP | 2001514021 A | 9/2001 |
| JP | 2001352896 A | 12/2001 |
| JP | 2003250431 A | 9/2003 |
| WO | 1999009839 A1 | 3/1999 |
| WO | 1999011147 A1 | 3/1999 |
| WO | 2011113771 A1 | 9/2011 |

OTHER PUBLICATIONS

Viernstein, H. et al. (2005). Stabilization of probiotic microorganisms; in Nedovic V. et al. (eds.) Applicationis of Cell Immobilization Biotechnology. pp. 439-453. Netherlands.*

Recipe: Homemade 'Jammy Dodgers' warm bread and honey website, http://web.archive.org/web/20110204183232/http://warmbreadandhoney.wordpress.c . . . , Jan. 27, 2011, pp. 2-4, printed Sep. 16, 2015 (3 pgs.).

Raspberry & Cream Viennese Biscuits, GNPD website, http:/www.gnpd/sinatra/recordpage/1570210/from_search/eIRFpkcF5C/, pp. 2-3, printed Sep. 16, 2015 (2 pgs.).

English translation of Notice of Reasons for Rejection for Japanese Application No. 2015-512086 (8 pgs.).

Bibliographic data: JPH09509321(A) from Espacenet (1 pg.).

International Search Report and Written Opinion of the International Searching Authority, dated Jul. 2, 2013 PCT/EP2013/061496 (11 pgs.).

European Patent Office Communication dated Nov. 19, 2012 and Search Report date of completion Nov. 12, 2012 for Application No. 12305657.4-1221 (9 pgs.).

Indian Examination Report, dated Apr. 13, 2018 for Indian Patent Application No. 8748/CHENP/2014 (5 pgs.).

* cited by examiner

FOOD PRODUCT WITH FILLING WITH HIGH AMOUNT OF LIVE LACTIC CULTURES

CROSS REFERENCE TO RELATED APPLICATIONS

This application is a U.S. national phase application of International Application No. PCT/EP2013/061496, filed Jun. 4, 2013, which claims benefit from from Europe Application 12305657.4, filed Jun. 8, 2012, which are hereby incorporated herein by reference in their entirety.

FIELD

The present case relates to the field of food products comprising a biscuit part and a filling part. More particularly, it relates to such food products where the filling part comprises a water-based filling together with an anhydrous filling containing live lactic cultures.

BACKGROUND

It is known to make food products comprising a biscuit part and a filling part. It is also known for these food products to include in the filling part a water-based filling and an anhydrous filling with live lactic cultures. Anhydrous fillings comprising live lactic culture are usually produced with yoghurt.

Yoghurt is the product of milk fermentation by symbiotic cultures of *Streptococcus thermophilus* and *Lactobacillus delbrueckii* subspecies *bulgaricus*. Yoghurt is known to have beneficial properties, such as facilitating lactose digestion. These beneficial properties arise from the presence of the two strains of bacteria in large quantities: in particular, the yoghurt has a total cell count of the population of both strains of over $10^7$ cfu/g (cfu: colony-forming unit). However, the shelf-life of yoghurt is usually short; usually less than 2 months for fresh yoghurt. Therefore, yoghurt is usually kept at low temperature to limit decay of lactic cultures and organoleptic properties modification.

It is known to make yoghurt powders since they have a longer shelf-life with respect to the organoleptic properties. They are obtained via various drying methods such as freeze-drying and spray-drying. For economic reasons, spray drying is more commonly used. However, spray-drying is more detrimental to lactic culture survival than freeze-drying during production and, thus, results in a greater loss of lactic cultures during drying. Consequently, most of the commercially available yoghurt powders only contain limited amounts of live lactic cultures; lower than $10^7$ cfu/g of yoghurt powder. These are, moreover, not sufficiently viable during storage.

Food products currently on the market that comprise a biscuit part and a filling part, with an anhydrous filling comprising live lactic cultures (yoghurt filling), use yoghurt powders obtained from spray-drying. Their live lactic culture cell counts (hereafter cell count) are therefore lower than the value required by Codex Alimentarius (CODEX STAN 243-2003). The inventors measured the cell count values for various commercially available food products comprising a biscuit part and a filling part. Results showed that cell count values were all under $10^5$ cfu/g for the yoghurt filling, except for products using the method of FR2895877.

FR2895877 provides a method for producing yoghurt powder with high amount of live lactic cultures, i.e. higher than $5 \times 10^5$ cfu/g of yoghurt powder. This yoghurt powder can be used in fillings for producing sandwich biscuits with a high cell count.

The inventors have realised that a food product comprising a biscuit part and a filling part could provide both a pleasant slightly acidic taste due to lactic cultures and another taste such as fruit. Although such food products exist, these products' cell count values are lower than $10^5$ cfu/g of anhydrous filling.

The use of the yoghurt powder produced according to FR2895877 was trialled by the inventors in an anhydrous filling incorporated into a food product together with a water-based filling. However, when the anhydrous filling comprising the yoghurt powder of FR2895877 was put into direct or indirect contact with a water-based filling, decay of live cultures was strongly accelerated. In this trial, 10 wt. % of yoghurt powder, 80 wt. % glucose syrup and 10 wt. % fat were mixed in order to obtain a water-based filling. The Aw of the filling was 0.70. The filling was stored at 20° C. The initial cell count was 8.5 $\log_{10}$ cfu/g of filling and decreased down to 6.5 $\log_{10}$ cfu/g of filling after only 1 month. The same fast decay was obtained with fillings with Aw of 0.60, 0.65 and 0.75. It was therefore not possible to keep the cultures alive for several months using a water-based filling at intermediate moisture.

WO 99/11147 A1 describes a food composition where the cream is deposited on one or more biscuit layers.

WO 2011/113771 A1 describes a dried fermented dairy product.

EP 0 948 896 A1 describes a cream filling for bakery products.

EP 1 269 857 A2 describes a filling for bakery products comprising yogurt powder.

FR 2 811 867 A1 describes a baked product with a filling comprising live or active yeast.

EP 1 010 372 A2 describes a baked good with a filling comprising live lyophilized lactic bacteria.

WO 99/09839 A1 describes a paste-like composition containing live microorganisms.

EP 0 666031 A2 describes a cream filling for bakery products based on anhydrous food fats.

EP 0 687 420 A2 describes a filling for bakery products.

FR 2 895 877 A1 describes a powder of fermented milk or of yogurt.

Therefore, one aim is to provide a food product comprising a biscuit part and a filling part, the filling part of which comprises a water-based filling and an anhydrous filling with live lactic cultures, that tackles the drawbacks associated with the prior art, or at least provides a commercial alternative thereto.

According to a first aspect, there is provided a food product comprising a biscuit part and a filling part, the filling part including a water-based filling and an anhydrous filling with live lactic cultures, wherein the water-based filling and the anhydrous filling are distinct, and wherein the anhydrous filling has a lactic cultures cell count of at least $10^5$, preferably $10^6$, more preferably $10^7$ cfu per gram of the anhydrous filling. The food product presents a decay rate of the lactic cultures of at most 0.25 $\log_{10}$ cfu/g of anhydrous filling per month.

The present disclosure will now be described further. In the following passages different aspects/embodiments of the disclosure are defined in more detail. Each aspect/embodiment so defined may be combined with any other aspect/embodiment or aspects/embodiments unless clearly indicated to the contrary. In particular, any feature indicated as being preferred or advantageous may be combined with any other feature or features indicated as being preferred or advantageous.

The food product can be a layered biscuit, preferably a sandwich biscuit or a single biscuit with filling lying on one surface thereof. The food product can also be a filled biscuit, the edges of which are closed.

In the following specification, "biscuit part" means any baked cereal products, with a low moisture content (less than 5%) and a crispy texture, made from a dough or a batter, that includes the commonly known biscuits, cookies, crackers, wafers, and backed granola bars, preferably biscuits, cookies, crackers and wafers. The biscuit part can consist in only one, two or more biscuits. When there is only one biscuit, the filling part can be deposited wholly onto one surface thereof or partially on each surface. The filling part can also be deposited inside the biscuit. When there are two or more biscuits, the filling part may be layered between two biscuits.

The biscuit part may also contain inclusions, i.e. small pieces of edible particles with a size lower than 4 mm. Inclusions may be chocolate drops, nuts like hazelnut (preferably hazelnut pieces), extruded cereal, etc. Inclusions do not include cereal flakes. Inclusions bring texture and flavour without increasing SAG content. The food product advantageously comprises 2 wt. % to 15 wt. % inclusions, preferably 4 wt. % to 10 wt. %.

Chocolate drops are pieces of solid chocolate. "Chocolate" is understood as meaning either "dark chocolate", "milk chocolate" or "white chocolate". Preferably, chocolate drops are dark chocolate pieces containing at least 35 wt. % of cocoa liquor (US legislation), more preferably 35 wt. % of cocoa solids (European Union legislation), still more preferably at least 40 wt. %.

"Filling part" means any edible substance that is suitable for being placed inside or onto a biscuit or between the layers of a sandwich biscuit. The filling part consists in at least two different fillings with different compositions.

"Water-based filling" is a filling, wherein water forms a continuous phase throughout the whole filling, with contrast to "anhydrous filling", wherein fat forms a continuous phase throughout the whole filling. In a preferred embodiment, the water-based filling and the anhydrous filling directly contact each other.

By "distinct" it is meant that the water-based filling and the anhydrous filling have different compositions and can be differentiated in the final food product, either visually or organoleptically. Preferably the water-based filling and the anhydrous filling are physically distinct. That is, although they may be in contact, they form separate layers or structures within the food product. For example, the water-based filling and the anhydrous filling may form separate lines, perhaps lying parallel to each other between two biscuit portions.

"Lactic culture" means any bacteria suitable for producing fermented food product yielding lactic acid. These bacteria are chosen amidst the genus of *Lactobacillus, Lactococcus, Streptococcus* and *Bifidobacteria*. Examples of *Lactobacillus* are *L. acidophilus, L. delbrueckii, L. kefiri, L. helveticus, L. salivarius, L. casei, L. curvatus, L. plantarum, L. sakei, L. brevis, L. buchneri, L. fermentum* and *L. reuteri*. One example of *Lactococcus* is *L. lactis*. One example of *Streptococcus* is *S. thermophilius*. Examples of *Bifidobacteria* are *B. bifidum, B. longum* and *B. infantis*.

In one preferred embodiment, if the anhydrous filling comprises yoghurt, then the lactic culture is a blend of *L. delbrueckii* and *S. thermophilus*, more preferably *L. delbrueckii*, subsp. *bulgaricus* and *S. thermophilus*.

As will be appreciated, the anhydrous filling has a lactic cultures cell count which is preferably measured at the point of production of the food product. This allows the decay rate of the lactic cultures to be measured over time relative to the initial levels achieved when the product is produced and has been packaged. Moreover, the measurement of the decay rate is performed on sealed products stored at about 20° C. The rate can be measured over a period of at least 4 months, preferably at least 6 months, preferably at least 7 months, and the decay rate determined.

The water activity (Aw) of a product is a notion which is well known in the food industry field. This value measures the availability of water in a sample. In most cases, this water activity is not proportional to the water content of the product. Methods for measuring Aw of a product are known to the person skilled in the art. For example, it can be measured with an Aqualab CX-2 or series 3, or a Novasina. All Aw values indicated hereafter are measured at 25±0.2° C.

The overall Aw value of the food product is preferably lower than 0.22, preferably lower than 0.20, more preferably lower than 0.18. The biscuit part preferably has a water activity value lower than 0.15, preferably lower than 0.10, more preferably lower than 0.07. The water-based filling preferably has a water activity value lower than 0.45, preferably lower than 0.40, more preferably lower than 0.37. The anhydrous filling preferably has a water activity value lower than 0.35, preferably lower than 0.30, more preferably lower than 0.25. The anhydrous filling preferably comprises yoghurt, for example in a powder form.

The inventors have found that the water activity of the biscuit part and the filling part should be carefully managed to meet the above mentioned values, otherwise lactic cultures will decay at a rapid pace during storage. It should be mentioned that the overall water activity value of the food product cannot be directly computed from the water activity values of the biscuit part, the water-based filling and the anhydrous filling. Indeed, although the driving force for water migration is the Aw gradient, the final overall water activity value depends on water content of each component of the food product and on the extent to which moisture migration will take place. This cannot be simply predicted, especially when two different fillings and a biscuit part are put in contact.

The water-based filling preferably comprises fruit. In this case, the water activity value of the water-based filling can be decreased by concentrating the fruit juice or pureeing the fruit and eventually adding water-activity depressors such as sugars and/or polyols.

The inventors have surprisingly found out that with a biscuit part and filling part having the foregoing water activity values, it was possible to keep the lactic cultures alive during production and storage for a long period of time (at least 4 months, preferably at least 6 months at 25° C.).

The water-based filling, as already mentioned before, can comprise fruit. Moreover, the term "fruit" is here intended to mean any "natural" fruit excluding the dry fruits commonly called "nuts" (such as walnuts, hazelnuts, almonds, peanuts, cashew nut, pecan nut). Advantageously, the fruit is orchard fruit, more advantageously chosen in the group consisting of red fruit such as strawberries, raspberries, blueberries, blackcurrant, redcurrant, cranberry, elderberries or blackberries, exotic fruit such as pineapple, mango, passion fruit, pomegranate, litchi or kiwi, melon, peach, apricot, banana, cherries, apples, pears, citrus fruit such as orange, lemon, grapefruit, citrus or clementine, grapes, plums, cherry, Mirabelle, figs, raisin, tomato, carrot, red bell pepper, pumpkin, dates, and mixture thereof, still more advantageously chosen in the group consisting of cranberry, apricot, apple, raspberry, strawberry, raisin, peach, fig, dates, cherries, plums, tomato and mixture thereof, more advantageously chosen in the group consisting of cranberry, apricot, apple, raspberry, strawberry, raisin, fig and mixture thereof. By extension, Rhubarb is also included in the term "fruit", even though it is not a botanical fruit, since it is usually classified and used as a fruit in cooking.

The fruit contained in the water-based filling can contain soft fruit particles, in which case, the maximum size of the soft fruit particles is 4 mm.

The water-based filling may contain cooked fruit such as jam. Alternatively, the water-based filling may contain fresh or preserved fruit.

Further, the water-based filling may contain any extract of cocoa, coffee or tea. The water-based filling may be aerated or foamed, preferably to obtain a density (mass per unit volume) between 300 g/l and 1200 g/l. The foamed or aerated form of the water-based filling makes it possible to improve mouthfeel, i.e. the water-based filling is less sticky in the mouth.

Both anhydrous and water-based fillings can contain ungelatinised starch, especially wheat starch, such as described in FR2889650 (anhydrous filling) and FR2905563 (water-based filling). The presence of ungelatinised starch can improve the slowly digestible starch (SDS) content of the final product.

The food product preferably has a slowly-digestible-starch-over-total-available-starch ratio (SDS/(SDS+RDS)) of at least 31 wt. %, preferably at least 35 wt. %, more preferably at least 38 wt. %, still more preferably at least 40 wt. %. Total available starch comprises slowly digestible starch (SDS) and rapidly digestible starch (RDS). The difference between total available starch and total starch is that total available starch does not comprise resistant starch that cannot be digested, i.e. that escapes digestion in the small intestine.

Consumption of slowly digestible starch in place of rapidly digestible starch is believed to be beneficial for health. Indeed, rapidly digestible starch is rapidly broken down into glucose during digestion and thus rapidly made available to the body. Therefore, the fast appearance of glucose from biscuits in the blood leads to a higher peak of glycaemic response. On the contrary, slowly digestible starch is slowly assimilated by the body due to an appearance of glucose from food products that is slower and maintained over time, thus providing long-lasting energy.

SDS or slowly available glucose (SAG) can be characterised through the slowly available glucose (SAG) measurement by Englyst method ("Rapidly Available Glucose in Foods: an In Vitro Measurement that Reflects the Glycaemic Response", Englyst et al., Am. J. Clin. Nutr., 1999 (3), 69(3), 448-454; "Glycaemic Index of Cereal Products Explained by Their Content of Rapidly and Slowly Available Glucose", Englyst et al., Br. J. Nutr., 2003(3), 89(3), 329-340; "Measurement of Rapidly Available Glucose (RAG) in Plant Foods: a Potential In Vitro Predictor of the Glycaemic Response", Englyst et al., Br. J. Nutr., 1996(3), 75(3), 327-337). SAG refers to the amount of glucose (from sugar and starch, including maltodextrins) likely to be available for slow absorption in the human small intestine. In the present case, the SDS content equals the SAG content since there is no other SAG source than starch, i.e. SDS. Rapidly available glucose (RAG) refers to the amount of glucose likely to be available for rapid absorption in the human small intestine. RAG content is composed by the rapidly digestible starch and the glucose units provided by sugars included in the recipe. In Englyst method, biscuit samples are prepared by manually and roughly grinding one or more biscuits. The biscuit samples are then subjected to an enzymatic digestion by incubation in presence of invertase, pancreatic alpha-amylase and amyloglucosidase under standardised conditions. Parameters such as pH, temperature (37° C.), viscosity and mechanical mixing are adjusted to mimic the gastrointestinal conditions. After an enzymatic digestion time of 20 min, glucose is measured and is labelled RAG. After an enzymatic digestion time of 120 min, glucose is again measured and is labelled available glucose (AG). SAG is obtained by subtracting RAG to AG (SAG=AG−RAG), thus, SAG corresponds to the glucose fraction released between the 20th and the 120th minute. Free glucose (FG), including the glucose released from sucrose, is obtained by separate analysis. RDS is then obtained as the subtraction of FG from RAG (RDS=RAG−FG).

Advantageously, the food product has at least 15 g SAG/100 g food product. This food product particularly complies to long-lasting energy criteria, i.e. SAG value over 15 g/100 g biscuit or slowly-digestible-starch-over-total-available-starch ratio of at least 31% with respect to the total weight of the food product. Preferably, the food product has a SAG content of at least 16.5 g/100 g biscuit, more preferably at least 18.0 g/100 g food product, still more preferably at least 21.0 g/100 g food product.

The decay rate of the live cultures in the food product at 25° C. is lower than 0.25 $\log_{10}$ cfu/g of the anhydrous filling per month, preferably lower than 0.20 $\log_{10}$ cfu/g per month, more preferably lower than 0.15 $\log_{10}$ cfu/g per month. The values are related to a gram of anhydrous filling.

According to a further aspect, there is provided a method for producing the food product described above. The method comprises the following steps:
 (a) providing a first biscuit forming at least a portion of the biscuit part, presenting a water activity value lower than 0.15, preferably lower than 0.10, more preferably lower than 0.07;
 (b) depositing a water-based filling onto the first biscuit presenting a water activity value lower than 0.45, preferably lower than 0.40, more preferably lower than 0.37;
 (c) cooling until the first filling cools down to 47° C. or lower, preferably higher than 20° C.;
 (d) depositing an anhydrous filling with live lactic cultures onto the first biscuit or onto the first filling;
 (e) optionally, providing a second biscuit forming another portion of the biscuit part on top of the filling part, presenting a water activity value lower than 0.15, preferably lower than 0.10, more preferably lower than 0.07, preferably at a temperature of 32° C. or lower, more preferably higher than 20° C.; and
 (f) optionally cooling the food product down to 23° C. or lower, preferably higher than 10° C. before packaging.

As described above, the water-based filling and the anhydrous filling are separately deposited on the biscuit part and at different temperatures. The deposition temperature of the water-based filling is higher that the deposition temperature of the anhydrous filling. This makes it possible to keep the lactic cultures alive during production. Indeed, the water-based filling, when cold, is a thick paste and cannot be processed at room temperature, especially in the case of a fruit-containing water-based filling to which water activity depressors are added. Thus, it becomes necessary to heat the water-based filling at a temperature as high as 50° C., or above, in order to be able to pump it and deposit a pre-set weight thereof onto the first biscuit. Heat is detrimental to live cultures, which are temperature sensitive.

The water-based filling is preferably heated to at least 45° C. before depositing, preferably 50° C., more preferably about 55° C. More in general, the water-based filling is heated to a temperature at which its viscosity reaches down to at most 54 Pa·s, preferably at most 45 Pa·s, more preferably at most 37 Pa·s. Techniques for measuring viscosity of such foodstuffs are well known in the art.

The anhydrous filling is preferably deposited at a temperature of 42° C. or lower, preferably at 39° C. or lower, more preferably higher than 37° C. More generally, the anhydrous filling is preferably heated to a temperature at which its viscosity reaches down to at most 13.5 Pa·s.

Step (a) and step (e) can comprise forming the first biscuit out of a dough, baking the first biscuit and cooling the first biscuit down to 35° C. or lower, preferably at 33° C. or lower, preferably higher than 20° C., before the water-based filling is deposited.

In order to obtain first, and eventually, second biscuits with a very low water activity value, it is possible to increase baking time thereof: this leads to the evaporation of more moisture. However, care should be taken so that gelatinisation of starch does not occur. Indeed, increased baking will creates a potential issue on starch structure preservation, what is required for keeping it slowly digestible. It also increases the gradient of water activity between the water-based filling and the biscuit, what could result in potential breakage or checking (checking refers to local cracking of biscuits occurring after baking, sometimes 2 weeks later. It can be visible or not and can lead to biscuit break during transport, storage or consumption). Increasing baking time also increases production cost, can generate product browning, various off-tastes (burnt flavour) and generate neo-formed compounds such as acrylamides.

FIGURES

The present disclosure will be described in relation to the following non-limiting figures, in which:

FIG. 1 is a flowchart illustrating the different steps of one embodiment of the method for producing a food product as described here above.

Figure 2:
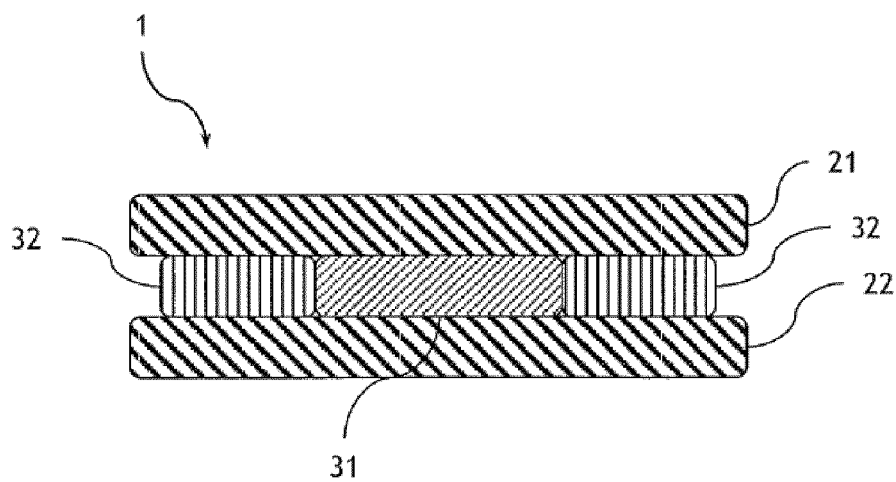

FIG. 2 schematically shows one embodiment of a food product 1 as described above in a sandwich biscuit form comprising a biscuit part and a filling part. The biscuit part comprises two biscuits 21, 22 between which lies the filling part. The filling part comprises two fillings: a water-based filling 31 and an anhydrous filling 32.

EXAMPLES

The present disclosure will now be described in relation to the following non-limiting examples.
Cell Count Measurement 5 g anhydrous filling containing lactic cultures is scooped out of the food product and dispersed into 45 g trypton salt diluent at 37° C. The dispersion is homogenised for 2 minutes with a Stomacher bag then kept under mild stirring during 30 minutes. After 30 minutes of mild stirring the dispersion is again homogenised for 2 minutes with a Stomacher bag.

The counting of lactic culture cells is then carried out according to the official standard method for enumerating lactic bacteria (ISO 7889, "Yoghurt: Enumeration of characteristic micro-organisms. A colony-count technique at 37° C."). The method is summed up hereafter.

The homogenised dispersion is further successively diluted to obtained several decimal dilutions of the test sample. Each decimal dilution is inoculated into 2 culture media in Petri dishes:
a) an acidified MRS medium, followed by anaerobic incubation at 37±1° C. for 72 hours for counting *Lactobacillus delbrueckii*, subsp. *bulgaricus;* and
b) an M17 medium, followed by aerobic incubation at 37±1° C. for 48 hours for counting *Streptococcus thermophilus.*

The Petri dishes for which the number of colonies is between 15 and 300 are selected for counting. The colonies are counted and the number of micro-organisms per gram of sample is calculated from the counted number of colonies and the dilution to which the selected Petri dishes correspond.
Viscosity Measurement of the Jam Filling The rheological behaviour of the water-based and anhydrous fillings was measured using a high performance rheometer MCR300 (Anton Paar Physica) interfaced with a PC. Viscosity was measured using coaxial cylinders geometry (TEZ 150PC and CC27) at different temperatures and at a shear rate of 2 s$^{-1}$.
Viscoelasticity Measurement Viscoelasticity measurements were achieved using the same rheometer MCR300 but equipped with a plate-plate geometry (TEK 150PC and a MP25 measuring plate). Small strain (0.01%) oscillatory measurements were performed at a constant frequency of 1 Hz, from which it was possible to determine the elastic modulus G' (Pa). G' reflects the solid contribution of a viscoelastic material and sharply increases when a three-dimensional network is formed, in given time-temperature conditions.

Example 1

A healthy sandwich biscuit is obtained by assembling two biscuits with a yoghurt filling and a jam filling. For a sandwich biscuit of 25.3 g, the weights of the different components are 18.5 g for the biscuit part, 3.4 g for the yoghurt filling and 3.4 g for the jam filling.

The different components are produced as follows:
Biscuit

The biscuit is produced as described in European Patent application n. 11290279.6, "Healthy layered cookie", of the same Applicant with the ingredients of table 1.

TABLE 1

| biscuit | |
|---|---|
| Ingredients | Quantity (wt. %) |
| Flour blend | 47.9 |
| Oat flakes | 14.1 |
| Sugar blend | 15.7 |
| Vegetable fat | 10.2 |
| Others (baking powders, salt, etc.) | 12.1 |
| TOTAL | 100.0 |

Jam Filling

The jam filling is produced by concentration from the different ingredients of table 2. At the end of the production, the obtained jam filling is thick, with a measured viscosity of 222 Pa·s at 20° C.

TABLE 2 jam filling

| Ingredients | Quantity (wt. %) |
|---|---|
| Sugars | 58.5 |
| Moisturising agents | 30 |
| Fat | 5 |
| Fruit | 37 |
| Acidity regulator | 1.5 |
| Others (texturing agents, flavours, etc.) | 1 |
| Water removal | −33 |
| TOTAL | 100.0 |

Yoghurt Filling

The yoghurt filling is produced with the ingredients of table 3. Fat is first melted and incorporated in the mixer at a temperature of about 50-55° C. Then, all powders except yoghurt powder are dispersed under high shear in the melted fat. When added to the melted fat, the powders are at room temperature, so that their incorporation into the melted fat drops the temperature down to between 38° C. and 45° C.

The resulting mixture is then further mixed during 5 to 10 minutes at high speed to obtain a homogeneous mixture with a relatively fluid consistency. Yoghurt powder is then added to this mixture under shear and the whole is mixed for 2 to 5 minutes resulting in a yoghurt filling with a viscosity of about 14 Pa·s. The yoghurt filling is then transferred from the mixer into a double jacketed buffer tank kept at 41±1° C. with mild stirring.

TABLE 3 yoghurt filling

| Ingredients | Quantity (wt. %) |
|---|---|
| Fat | 27.5 |
| Sugars | 36.0 |
| Starch | 20.0 |
| Yoghurt powder | 11.0 |
| Sweet whey powder | 5.0 |
| Others (texturing agents, flavours, etc.) | 0.5 |
| TOTAL | 100.0 |

Assembling

After baking, biscuits are cooled on a transfer band down to a temperature of 30 to 35° C. The thick jam filling is extruded with a conventional plateau pump into a double jacketed buffer tank where it is heated to a temperature of 50 to 60° C., preferably 53 to 57° C. The conventional plateau pump is kept between 25° C. and 30° C. A band of jam filling is deposited onto a first biscuit through a Sollich™ depositing system. The assembly of first biscuit and jam filling is cooled down to a temperature of 32±1° C. for the biscuit and 40±1° C. for the jam filling.

A band of yoghurt filling at 37±2° C. is deposited on either side of the jam filling, and in contact therewith, forming with this latter the filling part. A second biscuit at 30±2° C. is deposited onto the top of the filling part, this second biscuit and the first biscuit forming the biscuit part.

The obtained sandwich biscuit is conveyed into a cooling tunnel. At the exit of the cooling tunnel, the sandwich biscuit is at a temperature of 21±2° C. and is immediately packaged into a sachet of aluminium foil, the sachet is then sealed.

The measured water activity values for the different components are: 0.06±0.02 for the biscuit; 0.35±0.02 for the anhydrous filling; and 0.36±0.02 for the jam filling when they are used during the assembling. The water activity value for the overall food product is 0.15±0.02.

Storage

The sandwich biscuit is stored in its sealed sachet at a temperature of 15 to 25° C., preferably 18 to 22° C. for 7 months. The water activity and moisture content inside the sachet is therefore governed by the water activity of each individual component of the sandwich biscuit and their relative weight.

Viscosity Measurement

The apparent viscosity at shear rate of 2 s$^{-1}$ varies significantly with temperature for the water-based filling (see Table 4). Viscosity remained manageable at high temperature but increased dramatically upon cooling. This illustrates the need to deposit the water-based filling hot, although such a high temperature may be detrimental to the live cultures contained in the anhydrous filling.

TABLE 4

Viscosity measurement for the water-based filling

| Temperature | Viscosity |
|---|---|
| 55° C. | 37 Pa·s |
| 45° C. | 54 Pa·s |
| 30° C. | 117 Pa·s |
| 20° C. | 222 Pa·s |

For the anhydrous filling, the viscosity showed little variation with temperature between 38° C. and 55° C. (in this temperature interval fat contained in the anhydrous filling is fully melted—see Table 5).

TABLE 5

Viscosity measurement for the anhydrous filling

| Temperature | Viscosity |
|---|---|
| 55° C. | 10.7 Pa·s |
| 50° C. | 11.4 Pa·s |
| 45° C. | 12.1 Pa·s |
| 42° C. | 13.4 Pa·s |
| 38° C. | 14.6 Pa·s |

At 30° C., however, viscosity increased sharply during measurement and a stable viscosity value could not be reached.

This behaviour is typically observed when viscosity is measured during the formation of the fat network that slows down then stops the flow. The filling is no longer a pumpable liquid but instead becomes a hard solid.

Viscoelasticity Measurement

In order to evaluate the temperature of setting of this fat network, it is best to use small-strain oscillatory measurements, in which the very low strain applied (0.01%) does not prevent or hinder network formation.

Anhydrous filling was deposited in the liquid state at 55° C., temperature at which fat is fully melted. Upon cooling the anhydrous filling at a pace of 1° C./min, the setting temperature detected by a sharp increase in G' was found to be about 24° C.

However, upon cooling at a pace of 0.1° C./min, setting temperature increased to 35° C. This results indicate that fat crystallisation may start at temperatures as high as 35° C. and possibly higher. This explains the need to keep the filling at temperatures of about 40° C. in the double jacketed buffer tank in order to keep a pumpable filling with a constant viscosity.

It is known by the person skilled in the art that depositing a constant weight and shape of filling onto a biscuit requires steady processing conditions; especially a stable pressure in the depositing system, which itself requires a stable viscosity value. Keeping the anhydrous filling at 40° C. up to about 3 hours, however, presents a risk of losing a significant amount of live cultures during the processing stage.

Evolution of the Cell Count During Storage

Several samples of sandwich were stored in their sachet at 25° C. for up to 9 months. At regular time intervals, one sachet containing 2 sandwiches was opened, the anhydrous filling was removed from the sandwich and the cell count was measured. The results in $\log_{10}$ cfu/g of yoghurt filling are shown in table 6 below.

TABLE 6

Cell count evolution

| Storage time (months) | Cell count |
|---|---|
| 0 | 8.8 |
| 0.7 | 8.6 |
| 1.4 | 8.7 |
| 4.9 | 8.1 |
| 9.8 | 7.9 |

The cell count decreases slightly with storage time at 25° C. In order to quantify the kinetics of live cultures decay during the storage, the decay rate can be calculated as follows (equation 1):

$$\text{Decay rate} = \frac{\log_{10}(C_0) - \log_{10}(C_f)}{\text{Storage time}}, \quad \text{(Eq. 1)}$$

where $\log_{10}(C_0)$ is the initial $\log_{10}$ cell count and $\log_{10}(C_f)$ the final $\log_{10}$ cell count. The decay rate is 0.10 $\log_{10}$ (cfu/g) per month.

After almost 10 months of shelf-life at 25° C., the lye culture cell count of the yoghurt filling of all sandwich biscuits is still above the threshold specified by the Codex Alimentarius. This is related to the low value of decay rate, resulting in a high survival of the live cultures during storage.

Comparative Example (Part A)

Three different sandwich biscuits were produced for this comparative test:
a first sandwich biscuit comprising only a yoghurt filling;
a second sandwich biscuit comprising two bands of yoghurt filling and one band of jam filling therebetween;
a third sandwich biscuit comprising two bands of jam filling and one band of yoghurt filling therebetween.

The precise weight of biscuit and fillings is indicated in Table 7 for a sandwich of 25.3 g.

TABLE 7

Composition of the samples of Comparative Example Part A.

| | Weight of biscuit | Weight of yoghurt filling | Weight of jam filling |
|---|---|---|---|
| Sandwich 1 | 18.3 g | 7.0 g | 0 g |
| Sandwich 2 | 18.3 g | 2.3 g | 4.7 g |
| Sandwich 3 | 18.3 g | 4.7 g | 2.3 g |

Biscuit, yoghurt filling and jam filling ingredients are those mentioned above. Assembling was done analogously to the assembling described above. Only the number of bands and places thereof are different for the first and third sandwich biscuits.

The sandwich biscuits were stored at 25° C.

Only the yoghurt filling was sampled for the cell count enumeration. The results in $\log_{10}$ cfu/g of yoghurt filling are shown in table 8 below.

TABLE 8

Cell count (in $\log_{10}$ cfu/g) of Comparative Example Part A.

| Storage time (months) | Sandwich 1 | Sandwich 2 | Sandwich 3 |
|---|---|---|---|
| 0 | 8.7 | 8.6 | 8.7 |
| 1.4 | 8.4 | 8.1 | 8.0 |
| 4.1 | 7.9 | 8.2 | 8.1 |
| 7 | 7.3 | 7.1 | 7.7 |
| 7 (duplicate) | 7.3 | 7.3 | 7.7 |

The cell count decreases with time during storage at 25° C.

However, the decay is comparable for sandwich 1 (sandwich biscuit containing only the yoghurt filling) (0.20 $\log_{10}$ cfu/g per month) and for those containing both yoghurt and jam fillings (0.14 $\log_{10}$ cfu/g per month for sandwich 2 and 0.21 $\log_{10}$ cfu/g per month for sandwich 3).

After 7 months of shelf-life at 25° C., the live culture cell count of the yoghurt filling of all sandwich biscuits is above the threshold specified by the Codex Alimentarius.

The overall water activity of the food product was 0.12±0.02 for sandwich 1, 0.16±0.02 for sandwich 2, 0.14±0.02 for sandwich 3.

The standard defined by the Codex Alimentarius requires that the minimal quantity of live cultures is $10^7$ cfu per gram of lactic portion in a fresh dairy product.

Therefore, both sandwich biscuits that contain yoghurt and jam fillings in contact to each other fulfil this requirement.

Comparative Example (Part B)

Comparative Example Part B relates to a sandwich biscuit, which differs from Part A in that:
ratio of yoghurt filling:jam filling is (2:1);
water activity value of the biscuit is 0.18 due to a shorter baking time;
water activity value of the jam filling is 0.44 due to a lower water removal;
the water activity value for the final sandwich biscuit is 0.27.

Assembling and storage conditions are the same as in Example 1.

Only the yoghurt filling was sampled for the cell count enumeration. The results in $\log_{10}$ cfu/g of yoghurt filling are shown in table 9 below.

TABLE 9

Cell count (in log₁₀ cfu/g) of Comparative Example 2

| Storage time (months) | Cell count |
|---|---|
| 0 | 8.7 |
| 1.4 | 8.1 |
| 4.1 | 7.6 |
| 7 | 6.5 |
| 7 (duplicate) | 6.5 |

Decay rate of the lactic cultures reaches 0.31 $\log_{10}$ cfu/g per month, thus much higher than the decay rate of Part A.

Comparative Example (Part C)

Comparative Example Part C relates to a sandwich biscuit, which differs from Part A in that:
 water activity value of the biscuit is 0.18 due to a shorter baking time;
 water activity value of the jam filling is 0.53 due to a lower water removal;
 the water activity value for the final sandwich biscuit is 0.30.

Assembling and storage conditions are the same as in Example 1.

Only the yoghurt filling was sampled for the cell count enumeration. The results in $\log_{10}$ cfu/g of yoghurt filling are shown in table 10 below.

TABLE 10

Cell count (in log₁₀ cfu/g) of Comparative Example Part C.

| Storage time (months) | Cell count |
|---|---|
| 0 | 8.8 |
| 0.7 | 8.6 |
| 1.4 | 8.1 |
| 4.9 | 6.5 |
| 9.8 | 4.4 |

Decay rate of the lactic cultures reaches 0.45 $\log_{10}$ cfu/g per month, thus much higher than the decay rate of Example 1 or part A.

The foregoing detailed description has been provided by way of explanation and illustration, and is not intended to limit the scope of the appended claims. Many variations in the presently preferred embodiments illustrated herein will be apparent to one of ordinary skill in the art, and remain within the scope of the appended claims and their equivalents.

The invention claimed is:

1. A method for producing a food product comprising a biscuit part and a filling part, the filling part including a water-based filling and an anhydrous filling with live lactic cultures, wherein the water-based filling and the anhydrous filling are distinct, and wherein the anhydrous filling has a lactic culture cell count per gram of the anhydrous filling of at least $10^5$ cfu/g, the food product presenting a decay rate of the lactic cultures of at most 0.25 $\log_{10}$ cfu/g of anhydrous filling per month, wherein the method comprises the following steps:
 (a) providing a first biscuit forming at least a portion of the biscuit part, presenting a water activity value lower than 0.15;
 (b) depositing a water-based filling onto the first biscuit presenting a water activity value lower than 0.45;
 (d) depositing an anhydrous filling with live culture onto the first biscuit or onto the first filling at a temperature of between 37° C. and 42° C.;
 wherein the water-based filling and the anhydrous filling are separately deposited on the biscuit part and at different temperatures, the deposition temperature of the water-based filling being higher with the temperature of the water-based filling being at least 45° C. before depositing, and
 wherein the method further comprises a cooling step (c) between steps (b) and (d) until the first filling cools down to 47° C. or lower before the anhydrous filling is deposited.

2. The method of claim 1, wherein step (a) comprises forming the first biscuit out of a dough, baking the first biscuit and cooling the first biscuit down to 35° C. or lower before the water-based filling is deposited.

3. The method according to claim 1, further comprising depositing a second biscuit forming another portion of the biscuit part on top of the filling part.

4. The method of claim 3, wherein the second biscuit is deposited at a temperature of 32° C. or lower.

5. The method according to claim 1, further comprising a step for cooling the food product down to 23° C. or lower before packaging.

6. The method according to claim 1, wherein the food product has an overall water activity of less than 0.22.

7. The method according to claim 1, wherein the anhydrous filling comprises yoghurt.

8. The method according to claim 1, wherein the water-based filling comprises fruit.

9. The method according to claim 1, wherein the water-based filling is a jam or contains fresh and/or preserved fruit.

10. The method according to claim 1, wherein the water-based filling has a water activity value lower than 0.37.

11. The method according to claim 1, wherein the biscuit part has a water activity value lower than 0.07.

12. The method according to claim 1, wherein a slowly-digestible-starch-over-total-available-starch ratio of the food product by weight is at least 31:100.

13. The method according to claim 1, wherein the food product is a sandwich biscuit or a single biscuit with filling lying on one surface thereof.

14. A method for producing a food product comprising a biscuit part and a filling part, the filling part including a water-based filling and an anhydrous filling with live lactic cultures, wherein the water-based filling and the anhydrous filling are distinct, and wherein the anhydrous filling has a lactic culture cell count per gram of the anhydrous filling of at least $10^5$ cfu/g, the food product presenting a decay rate of the lactic cultures of at most 0.25 $\log_{10}$ cfu/g of anhydrous filling per month, wherein the method comprises the following steps:
 (a) providing a first biscuit forming at least a portion of the biscuit part, presenting a water activity value lower than 0.15;
 (b) depositing a water-based filling onto the first biscuit presenting a water activity value lower than 0.37;
 (d) depositing an anhydrous filling with live culture onto the first biscuit or onto the first filling at a temperature of between 37° C. and 42° C., the anhydrous filling having a water activity of less than 0.30;
 wherein the water-based filling and the anhydrous filling are separately deposited on the biscuit part and at different temperatures, the deposition temperature of the water-based filling being higher and at least 45° C. before depositing, wherein the method further comprises a cooling step (c) between steps (b) and (d) until the first filling cools down to 47° C. or lower before the anhydrous filling is deposited, and wherein the food product has an overall water activity of less than 0.22.

\* \* \* \* \*